July 8, 1924.

W. L. FORWARD ET AL 1,500,306

DEEP WELL PUMP COLUMN COUPLING

Filed Oct. 5, 1922

INVENTORS
Walter L. Forward
John B. Keating
BY M. C. Frank
ATTORNEY

Patented July 8, 1924.

1,500,306

UNITED STATES PATENT OFFICE.

WALTER L. FORWARD, OF OAKLAND, AND JOHN B. KEATING, OF PIEDMONT, CALIFORNIA.

DEEP-WELL-PUMP COLUMN COUPLING.

Application filed October 5, 1922. Serial No. 592,495.

*To all whom it may concern:*

Be it known that we, WALTER L. FORWARD and JOHN B. KEATING, citizens of the United States, residing the said WALTER L. FORWARD at Oakland, in the county of Alameda and State of California, and the said JOHN B. KEATING at Piedmont, Alameda County, California, have invented certain new and useful Improvements in Deep-Well-Pump Column Couplings, of which the following is a specification.

Our invention relates to couplings, and in particular to the couplings employed in deep well turbine pumps for connecting the outer pipe-column sections together. Our coupling carries means for centering the inner pipe column with respect to the said outer pipe column, and also means for retaining the said inner column in position.

In deep well turbine pumps, it is common practice to surround the vertical drive shaft thereof with a column of pipe, to protect the shaft from the water discharged between it and the outer pipe column. It is necessary to center this inner pipe, align it, and secure it in position for the true running of the shaft. Devices used for this purpose have heretofore been subject to the objection that they would rust, and adhere to the pipe at their points of contact, making it very difficult to loosen the pipe for disengagement or withdrawal.

The major object of our invention is to obviate the objections enumerated. We accomplish the above and other objects, by providing our coupling with a strut projecting radially inwards, and terminating in a saddle member concentrically bored and against which the inner pipe seats; we further provide a ring bolt or equivalent device, to hold the said pipe against the said saddle, the ring being of larger diameter than the pipe. Thus the inner pipe is centered and loosely embraced at opposing points, but held firmly in position. To free the inner pipe from its saddle, it is only necessary to loosen the securing bolt, and by a tap with a hammer the engagement will be loosened.

In the accompanying one sheet of drawings we have illustrated a portion of a pump column, sufficient for an understanding of the invention.

Referring to the drawings:—

Figure 1:
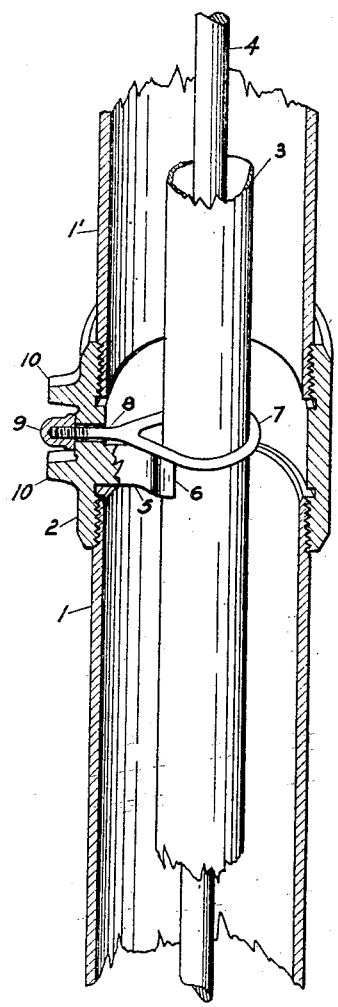
Figure 1 is a perspective view showing in vertical section, a portion of the outer pipe column, and our coupling joining two sections thereof, and showing in elevation therein, a portion of the shaft and the inner pipe column, a saddle and a cooperating ring bolt for centering and holding the inner pipe in position.
Figure 2:
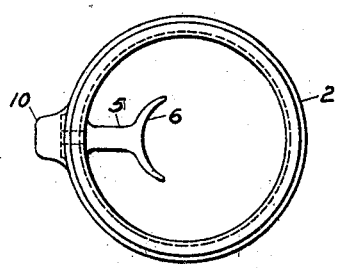
Figure 2 is a plan of the coupling, with its strut and saddle.

1 represents a section of the discharge or outer pipe column, and 2 our coupling for connecting it to the adjacent section 1'; these parts and similar ones forming the outer pipe column of the pump. 3 represents the inner pipe column and 4 the pump shaft therein.

Projecting inwards from the coupling 2, is a strut 5, terminating in a saddle 6, the seat of which being bored concentric with the coupling bore, and against which seat, the pipe 3 may rest.

Loosely surrounding the pipe 3 is a ring 7, having a bolt shank 8 which passes through the coupling and projects therefrom, and is provided with a nut 9. This nut is preferably of the acorn type, and by it the ring bolt is caused to draw the pipe 3 to position in the saddle, thereby seating and aligning it, and securing it firmly in place.

Figure 3:
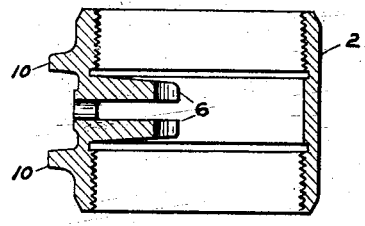
Figure 3 is a vertical section of the coupling, showing the saddle both above and below the bolt passage.

In Figure 1 we have shown, the ring bolt positioned above the saddle, but, with lighter pipe or tubing, and to prevent any bending tendency thereof, we prefer that the saddle shall have a bearing on the pipe both above and below the ring 7, as for example, as shown in Figure 3.

Upon the outer periphery of the coupling 2, above and below the nut 9, we place lugs 10 to protect the nut from injury, when lowering or withdrawing the various parts of the column in the well.

Having illustrated and described our invention in its preferred form for deep well turbine pumps, we wish it to be understood that the same may be modified as practice suggests. Therefore, the patent protection that we desire is all of that which comes within the spirit and scope of the invention as claimed.

We claim:

1. A pipe coupling, having, threaded ends for the reception of pipes, and between said ends a strut cast integral therewith and projecting radially inwards and terminating in a saddle, and the said saddle concentrically bored to center an inner pipe.

2. A threaded pipe coupling for deep well pumps, including, a saddle member thereon adapted to center a pipe therein, and a member opposed to said saddle member adapted to disengagedly hold said inner pipe firmly in position in said saddle.

3. In a deep well pump column, a coupling, comprising, a body threaded at each end for the reception of the outer column pipe sections, and a ring bolt member adapted to loosely encircle the inner pipe column, the said body provided with an inner projection and outer projections, the said inner projection adapted to partially encircle the said inner pipe column, and in conjunction with said ring bolt, center, align and hold the said inner column in position; the said outer projections on said body adapted to protect the nut of the said ring bolt from injury, in the lowering or withdrawing of the column in the well.

4. In a pumping apparatus having an inner and an outer pipe, a threaded coupling for the outer pipe having two opposing members loosely engaging said inner pipe, and adapted when tightened thereagainst, to hold the same firmly between the said members.

5. In a pumping apparatus having an inner and an outer pipe, a threaded coupling for the outer pipe having a saddle member against which the said inner pipe may seat, and a tension member loosely embracing the said pipe and adapted to draw the same firmly against the said saddle member.

6. In a pumping apparatus having an inner and an outer pipe, a saddle member against which the said inner pipe may seat, and a ring bolt loosely encircling the said inner pipe and adapted to draw the same firmly against the said saddle member.

7. In a pumping apparatus having inner and outer pipes, in combination with a coupling for adjacent sections of the outer pipe, a saddle member projecting inwards from the said coupling, and a bolt member extending through said coupling adapted to loosely engage the said inner pipe and draw it firmly against the said saddle member.

In testimony whereof, we affix our respective signatures.

WALTER L. FORWARD.
JOHN B. KEATING.